Aug. 14, 1945.     H. J. MURPHY     2,382,942

NUT AND NUT INSTALLATION

Filed Aug. 27, 1942

Inventor:
Howard J. Murphy.
By Walter S. Jones
Atty.

Patented Aug. 14, 1945

2,382,942

UNITED STATES PATENT OFFICE 2,382,942

NUT AND NUT INSTALLATION

Howard J. Murphy, Greenwood, Mass., assignor to United-Carr Fastener Corporation, Cambridge, Mass., a corporation of Massachusetts Application August 27, 1942, Serial No. 456,320

2 Claims. (Cl. 85—32)

The present invention relates to nut installations and more particularly to the improvement of sheet metal nut members adapted to be installed on and secured to sheet metal or like support having an aperture near one edge thereof.

One of the objects of the invention is the provision of a simplified nut member, which may be readily formed from a single piece of sheet material, and which may be positioned on one side of an apertured support, with portions thereof engaging on opposite sides of the support to securely hold the nut in place.

A further object of the invention is to provide a nut member of the above described type formed of readily bendable material so that a portion thereof may be manually bent around an edge of the support after the nut has been positioned with reference to the aperture.

Further objects to the invention are to improve generally nut fastenings of the above described types, as will be apparent to those skilled in the art from a consideration of the detailed description of the embodiments illustrated in the accompanying drawing, which is intended as purely illustrative of the invention.

Figure 1:
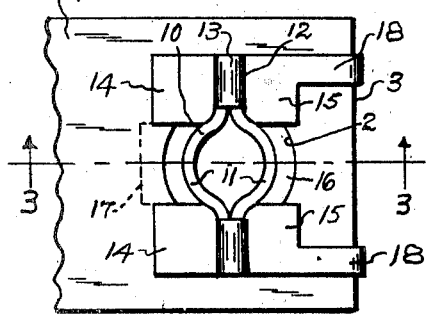
Fig. 1 is a top plan view of a nut installation embodying an improved nut according to the invention.

Referring to the illustrated embodiment of the invention shown in the drawing, the nut member is primarily designed for attachment to a support 1, having an aperture 2 therein near one edge 3 thereof which aperture may be circular in shape.

The nut member is preferably formed of a single piece of sheet metal deformed to provide a tubular barrel 10 preferably formed of opposed semi-cylindrical halves 11 having lateral wings or extensions 12 at their end edges, the latter being connected at their upper edges by folded bight portions 13. The semi-cylindrical halves 11 and wings 12 are disposed in planes normal to the base 14 or body of the nut blank and portions 15 of the base 14 are disposed beyond the periphery of the barrel to provide a support-engaging surface to limit movement of the barrel in the aperture 2 of the support in one direction.

The barrel 10 is preferably of a diameter to fit within the aperture 2, and preferably each of the halves 11 is formed with a depending extension 16 from the inner edge thereof, adapted to be positioned in and engage the wall of the aperture to limit shifting of the nut laterally relative to the aperture. One of the depending extensions 16 may be formed with an outturned foot 17 adapted to hook under and engage the opposite face of the support, the foot 17 being insertable in the aperture and hooked under the opposite face of the support by slightly tilting the nut on initial placement, as will be obvious. The inner faces of the halves 11, forming the interior of the barrel, are suitably tapped to provide screw-engaging threads, as will be understood in the art.

Figure 2:
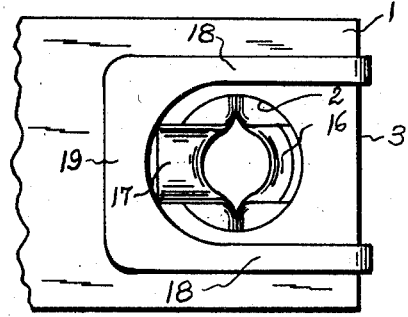
Fig. 2 is a bottom plan view thereof.
Figure 3:
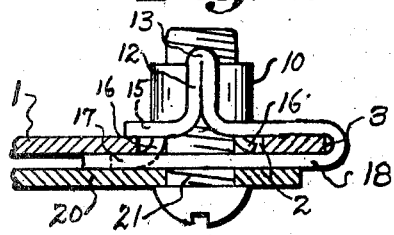
Fig. 3 is a detail vertical sectional view taken on the line 3—3 of Fig. 1, the nut being shown in side elevation.
Figure 4:
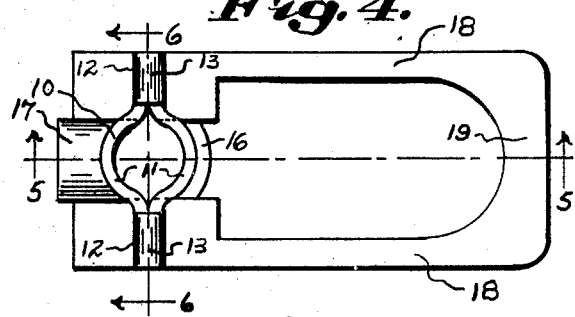
Fig. 4 is a plan view of the nut member per se, before being applied to a support.
Figure 6:
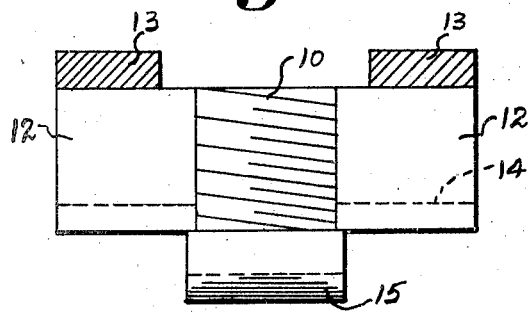
Fig. 6 is an enlarged transverse sectional view taken on the line 6—6 of Fig. 4.
Figure 5:
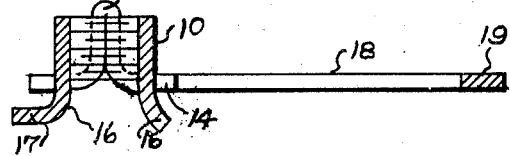
Fig. 5 is a longitudinal sectional view of the nut taken on the line 5—5 of Fig. 4.
Figure 7:
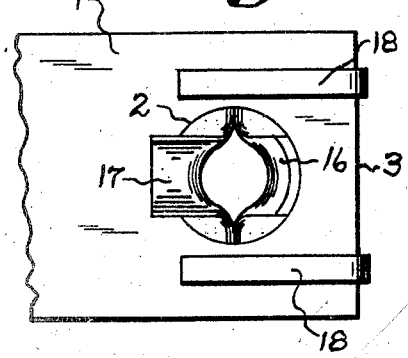
Fig. 7 is a bottom plan view of one modified embodiment of the invention.
Figure 8:
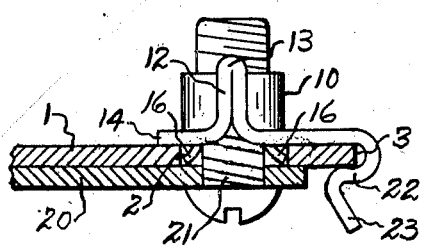
Fig. 8 is a longitudinal sectional view of another modified embodiment of the invention.

One pair of the portions 15 of the base 14 is formed with lateral extensions 18 of sufficient length to be folded over the adjacent edge 3 of the support 1, to prevent rotation of the nut in the aperture 2. The extensions 18 may be folded back on the inner face of the support as shown in Figs. 2, 3 and 8, to cooperate with the portions 15 in securing the nut against displacement from the aperture 2 of the support. If desired, the extensions may be connected by a bight portion 19, see Figs. 2 and 4, which surrounds the aperture and provides for access of the screw to the nut.

In use, the nut may be applied to the rear face of the support 1 in the manner described and the extensions bent against the forward face to hold the nut in position. An apertured member 20 to be supported may then be positioned over the extensions 18 and the screw 21 passed through the aperture of the member 20 and threaded into engagement with the screw-receiving barrel 10. The entire installation is thus securely clamped together.

Instead of forming the nut of readily bendable soft sheet metal, as above described, it may be formed of somewhat stiffer resilient metal and the extensions 18 formed with a laterally offset hooked portion 22 for snap fastener engagement with the adjacent edge 3 of the support, as illustrated in Fig. 8. In this construction, the extension 23 is formed without a foot to allow the apertured member 20 to rest directly against the support 1. Thus the extension 23 and the extension 24 cooperate to limit the shifting movement of the nut and let the hook 22 hold the nut in place.

Although I have illustrated and described preferred embodiments of my invention, I do not wish to be limited thereby because the scope of my invention is best defined by the following claims.

I claim:

1. A one-piece sheet metal nut for attachment to a sheet metal support having an aperture therethrough adjacent one edge thereof, said nut comprising a pair of opposed substantially semi-cylindrical threaded portions forming a substantially tubular screw-receiving barrel, pairs of wings formed along the meeting edges of said opposed semi-cylindrical portions, the wings of each pair being joined by bight portions at one end of the barrel and providing the connecting means for the semi-cylindrical portions, lateral extensions formed on the other end of said wings and providing a base for said nut disposed normal to the axis of said barrel and adapted to engage one face of the support, at least one of said lateral extensions being of a length to engage over the adjacent edge of the support and a portion of the opposite face thereof to securely position the nut on the support.

2. A one-piece sheet metal nut for attachment to a sheet metal support having an aperture therethrough adjacent one edge thereof, said nut comprising a pair of opposed substantially semi-cylindrical threaded portions forming a substantially tubular screw-receiving barrel, pairs of wings formed along the meeting edges of said opposed semi-cylindrical portions, the wings of each pair being joined by bight portions at one end of the barrel and providing the connecting means for the semi-cylindrical portions, lateral extensions formed on the other end of said wings and providing a base for said nut disposed normal to the axis of said barrel and adapted to engage one face of the support, at least one pair of said lateral extensions being of a length to engage over the adjacent edge of the support and a portion of the opposite face thereof to securely position the nut on the support.

HOWARD J. MURPHY.